(12) United States Patent
Dolzer et al.

(10) Patent No.: US 10,848,385 B2
(45) Date of Patent: Nov. 24, 2020

(54) CIRCUIT BOARD FOR A SERVER SYSTEM AND SERVER SYSTEM

(71) Applicant: FUJITSU LIMITED, Kawasaki (JP)

(72) Inventors: Herbert Dolzer, Munich (DE); Hans-Jürgen Heinrichs, Altenbeken (DE)

(73) Assignee: FUJITSU LIMITED, Kawasaki (JP)

( * ) Notice: Subject to any disclaimer, the term of this patent is extended or adjusted under 35 U.S.C. 154(b) by 280 days.

(21) Appl. No.: 15/641,445

(22) Filed: Jul. 5, 2017

(65) Prior Publication Data
US 2018/0013632 A1    Jan. 11, 2018

(30) Foreign Application Priority Data
Jul. 6, 2016  (DE) .................... 10 2016 112 407

(51) Int. Cl.
*H04L 12/24*   (2006.01)
*G06F 1/18*    (2006.01)
*H04L 5/00*    (2006.01)

(52) U.S. Cl.
CPC .............. *H04L 41/12* (2013.01); *G06F 1/184* (2013.01); *G06F 1/185* (2013.01); *H04L 5/0048* (2013.01)

(58) Field of Classification Search
CPC ....... H04L 41/12; H04L 5/0048; G06F 1/184; G06F 1/185
See application file for complete search history.

(56) References Cited

U.S. PATENT DOCUMENTS

| | | | | |
|---|---|---|---|---|
| 4,755,934 A * | 7/1988 | Inoue | ................. | G06F 12/0653 361/679.32 |
| 6,484,215 B1 * | 11/2002 | Gibart | ................. | G05B 19/054 710/3 |
| 7,411,915 B1 * | 8/2008 | Spain | ................. | H04L 41/0806 370/250 |
| 9,575,925 B2 * | 2/2017 | Tung | ................. | G06F 13/4291 |
| 2005/0254435 A1 * | 11/2005 | Moakley | ................. | H04L 67/16 370/252 |
| 2006/0133368 A1 * | 6/2006 | Tolliver | ................. | G06F 1/266 370/389 |
| 2009/0172234 A1 * | 7/2009 | Ji | ................. | G06F 13/409 710/300 |
| 2014/0223039 A1 | 8/2014 | Wu et al. | | |
| 2017/0093102 A1 * | 3/2017 | Huang | ................. | H01R 12/721 |
| 2017/0181314 A1 * | 6/2017 | Leigh | ................. | H05K 7/1492 |
| 2017/0215296 A1 * | 7/2017 | Tsai | ................. | H05K 7/1487 |

FOREIGN PATENT DOCUMENTS

DE    102013111975    2/2015

OTHER PUBLICATIONS

GBSR—Search Report for Great Britain Patent Application No. 1710869.7 dated Dec. 20, 2017.
GB Examination Report dated Jul. 13, 2020 for GB Patent Application No. GB1710869.7.

* cited by examiner

*Primary Examiner* — Viet D Vu

(74) *Attorney, Agent, or Firm* — Fujitsu Patent Center

(57) ABSTRACT

The application relates to a circuit board for a server system. The circuit board is adapted to be installed either in a server of a first type or in a server of a second type different from the first type. The circuit board includes connections for receiving assembly groups and a controller to provide a counting order to the connection depending on the server in which the circuit board is connected being a first type or a second type.

9 Claims, 2 Drawing Sheets

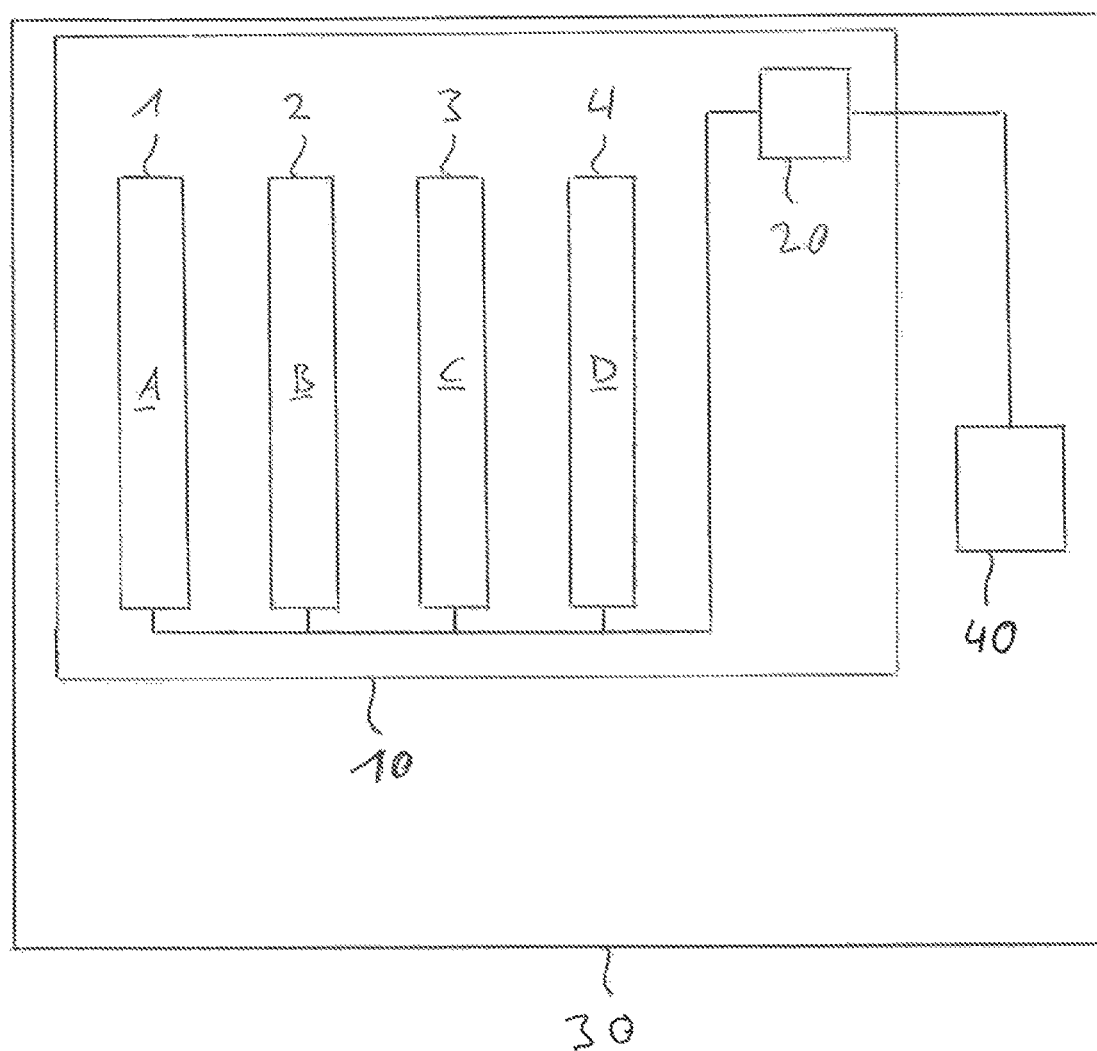

CIRCUIT BOARD FOR A SERVER SYSTEM AND SERVER SYSTEM

Figure 2A:
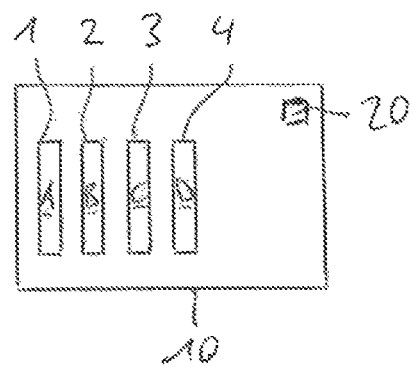

Server systems are used in various forms. For example, rack server systems containing multiple rack server plugins each having individual servers are used in computing centers or companies. Others use servers, the casings of which are similar to desktop PCs, so-called tower servers. There are other types of servers, some of which have a component structure which is substantially different in the server system.

Usually, in each case separate components are fabricated and used for servers of different types. This requires construction effort in each case, which involves costs for development and production.

In a server, multiple hard disks are arranged via a hard disk back wall in the server, for example. Different server types have different arrangements of the individual hard disks on the hard disk back wall.

The object of the invention is to provide an option of arranging assemblies (assembly groups or modules) in server systems in a flexible manner.

According to a first aspect, the object is achieved by a circuit board for a server system. The circuit board is adapted to be installed either in a server of a first type or in a server of a second type, which is different from the first type. The circuit board comprises connections (or ports) for receiving assemblies and a control. The control is adapted to show an order of the connections depending on the types.

Such a circuit board can be installed in server systems of different types. In such server systems, usually a predefined numbering of the hard disks, i.e. the order of the hard disks, is set. This has an influence on LED status indicators, which correlate with the individual hard disks. In the case that the circuit board is to be used in a different server type, the order of the mounted components may possibly not comply with the specification of the first server type there. According to the invention, a circuit board with a controller is provided, which can show the order of the connections depending on the types of the server systems. In this case, the mechanical arrangement of the assembly connections will not change. The controller is rather connected between the mechanical connections or their bus lines and the server system, in particular a management controller of the server system. The controller will show the order of the connections in such a way as to correspond to the specification for the server type in which the circuit board is installed. For example, an order of the assemblies goes from left to right in a server system of a first type, and the order of the assemblies goes from right to left in a server system of a second type. The controller shows this arrangement depending on the server type.

According to an advantageous embodiment, the controller is adapted to receive a control signal of a microcontroller connected to the circuit board, and to show the order of the connections depending on the control signal.

If the controller is provided with a target order via a control signal, this facilitates the technical implementation of the arrangement. The target order corresponds to the arrangement form of the connections expected by the server type.

According to a second aspect of the invention, the object is achieved by a server system with a circuit board of the above described type and a microcontroller. A target order of the connections of the circuit board is stored in the microcontroller. The microcontroller is adapted to send a control signal to the controller, which includes the target order of the connections and depending on which the controller can show the order of the connections.

A server system typically comprises a mainboard. A microcontroller, in particular a baseboard management controller (BMC), is arranged on this mainboard, for example. This microcontroller controls management tasks of the server system. A target order of circuit board connections for assemblies can be stored in such a microcontroller, e.g. by preprogramming. If only one circuit board of the above type is mounted in a server system, the BMC can communicate the connection order, i.e. the target connection order, expected for this type of server system to the controller on the circuit board via a control signal. The controller of the circuit board is adapted to show the mechanically available connections of the circuit board and their identifiers for the server system, in particular for the BMC, in such a way as expected by the server system. In this case, the controller functions as an electronic adapter, which can show the order of the connections in an altered manner.

Status LEDs associated with the hard disks can thereby be correctly controlled. This can be helpful for a user who intends to swap certain hard disks having a hot plug function during operation. If the correct status LEDs are activated, it is ensured that no hard disk is swapped that is not to be swapped or which must not be swapped, e.g. because the hard disk is being accessed at that time.

According to advantageous embodiments, the server system is a tower server system or a rack server system.

The different options of using the above described circuit board allow this circuit board to be used both in a tower server system and in a rack server system or in other system configurations. Thus, a single circuit board can be used for all server system types. The counting order of the connections is shown correctly, i.e. as expected, thanks to the controller on the circuit board.

Figure 2B:
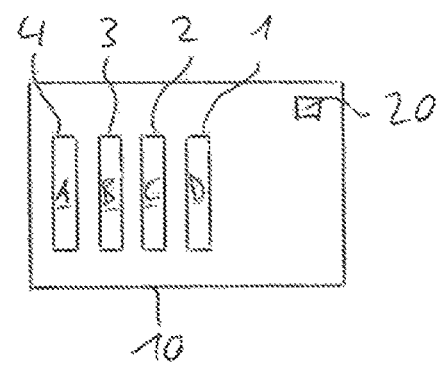
Figure 3A:
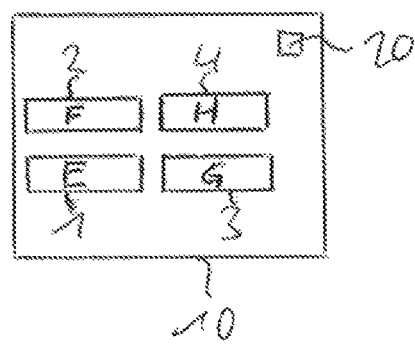
Figure 3B:
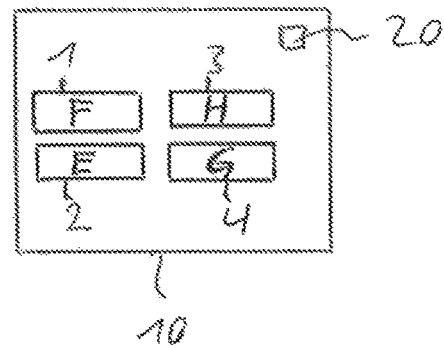

The invention will hereinafter be explained in more detail by means of figures and exemplary embodiments. The Figures show in:

FIG. 1 a schematic illustration of a server system and of a circuit board according to an embodiment of the invention, FIG. 2A the circuit board according to the exemplary embodiment of FIG. 1 in a first configuration, FIG. 2B the circuit board according to the exemplary embodiment of Figure in a further configuration, FIG. 3A a circuit board according to a second exemplary embodiment in a first configuration, and FIG. 3B the circuit board of FIG. 3A in a further configuration.

FIG. 1 shows a circuit board 10 in a server system 30. A controller 20 and four connections A, B, C, D for assemblies are arranged on the circuit board 10. In further configurations, the number of connections can vary. For example, merely two connections or eight connections are provided for assemblies.

In the exemplary embodiment, each connection A to D is a mechanical plug connection for a hard disk. Each connection A to D includes plug contacts, by means of which a hard disk can be connected to the circuit board 10. Here, the connection includes a mechanical and an electronic connection. In further embodiments, connections A to D may be connections for other assemblies such as PCI cards.

Connections A to D comprise status indicators, which are not shown in the Figures. For example, connections A to D each comprise two status LEDs, one LED for indicating access to an assembly plugged into connection A to D, and one LED that indicates whether the assembly has been identified by the server system 30. Here, identification includes detection of a type of an assembly, e.g. a solid state drive (SSD) or a mechanical hard disk, as well as of the storage capacity of the drive. Once the plugged assembly has been correctly detected by the server system 30, this is indicated via the corresponding status LED.

For each connection A to D, a cable connection is provided in the server system 30, which serves for transmitting data signals between the respective plugged assembly and the server system 30. These cable connections are not shown for the sake of clarity. The cable connection each lead from a connection A to D, e.g. from a back side of the circuit board 10, or also from another place of the circuit board 10, to a corresponding plug contact in the server system 30, e.g. on a mainboard (also not shown). As an alternative, the cable connections are directly connected to the respective assembly and not plugged on the circuit board 10, so that the circuit board 10 is by-passed.

The server system 30 comprises a microcontroller 40. In the exemplary embodiment, the microcontroller 40 is a baseboard management controller, BMC for short. In other configurations, the microcontroller may of course be a different microcontroller, which is either specifically provided for the functionality of the contact with the controller 20, or also fulfils further functions in the server system 30. In the exemplary embodiment, the microcontroller 40 is arranged on the mainboard of the server system 30, which is not shown for the sake of clarity.

The data transmission from the microcontroller 40 to the circuit board 10 is effected via an I²C bus. In further configurations, other protocols can be alternatively used.

The data transmission via cable between connections A to D and the server system 30 is unproblematic in terms of a connection change, since the cables can be plugged in any desired fashion. However, the bus lines on the circuit board 10 can not be changed as desired. In the case that the circuit board 10, which has been constructed for a rack server system, for example, is used in a tower server system, the standardized counting order of connections A to D according to the server type deviates from the order of the connection identifiers of connections A to D on the circuit board without further measures due to the altered orientation of the circuit board 10.

The controller 20 comprises data, by means of which the order, in particular the connection identification and connection numbering, can be shown in such a way that a target order of the server type is observed. In the exemplary embodiment according to FIG. 1, connection A is assigned number 1, connection B is assigned number 2, connection C is assigned number 3, and connection D is assigned number 4. This connection order corresponds to the connection order of a rack server system which has the hard disks inserted vertically and in which the counting order is from left to right. In this case, the microcontroller 40 would not have any problems to address these connections correctly even without the controller 20, since the controller is located in a rack server system.

However, if the circuit board 10 is used in other server systems, e.g. in a tower server system, a different mounting direction of the circuit board 10 is provided there. For example, the circuit board 10 is inserted in a manner turned by 90 degrees clockwise compared to the exemplary embodiment illustrated in FIG. 1. Now, the mechanical connection order of connections A to D is now counted from top to bottom and accordingly numbered 1 to 4 from top to bottom. However, in this context, a tower server system often requires counting order increasing from the bottom to the top, i.e. connection A should be number 4, connection B should be number 3, connection C should be number 2, and connection D should be number 1. The microcontroller in the tower server systems expects such a counting order for addressing the individual connections and the indicator elements connected here. The controller 20 is connected to the microcontroller. Thus, the microcontroller recognizes the identifier order, i.e. the counting order of connections A to D at the output of the controller 20. The actual mechanical order of parts A to D remains hidden from the microcontroller.

The controller 20 adapts the order of the connections in such a way that it is identical to the target order expected by the microcontroller. In this exemplary embodiment, the controller 20 reverses the order of connections A to D so that connection A has number 4 and the numbering continues in a decreasing manner, till connection D having number 1. For correct data transmission, data transmission cables are mechanically connected between connections A to D and the tower system accordingly.

FIGS. 2A, 2B, 3A and 3B schematically show arrangements of connections A to D and E to H. The bus lines are not shown in FIGS. 2A, 2B, 3A, and 3B for the sake of clarity. The two connection orders according to the above exemplary embodiment are once more shown in detail in FIGS. 2A and 2B.

In FIG. 2A, counting order goes from left to right, i.e. connection A has number 1, and the numbering increases along with the alphabetic order, till connection D having number 4. FIG. 2 shows another illustration of the connections, as can be provided by the controller 20, e.g. for a tower server system. Here, the order of numbering(s) is decreasing and thus against the alphabetic order of connections A to D. In other words, connection A has the highest number, which is 4 in this case, connection B has number 3, connection C has number 2 and connection D has number 1.

Of course, the identifiers 1 to 4 for the connections A to 4 are exemplary here. Numbering can be different in accordance with the number of present connections and the specifications of the corresponding server system. The numbering corresponds to a hexadecimal coding, for example.

FIGS. 3A and 3B show an alternative embodiment of the circuit board 10. In this embodiment, the circuit board 10 comprises connections E to H. In this case, connections E to H are arranged rectangularly, i.e. in each case two connections arranged on top of one another or next to one another. The method of counting in the embodiment of FIG. 3A is a method of counting from the bottom to the top and from left to right, i.e. connection E bottom left has number 1, connection F located above connection E has number 2, connection G located to the right of connection E has number 3 and connection H top right has number 4. In a server system unlike the one of FIG. 3A, the identifications can be shown differently by controller 20. In this case, the numbering corresponds to a method of counting from top to bottom and from left to right. In the example of FIG. 3B, connection F has numbering 1, connection E has numbering 2, connection H has numbering 3 and connection G has numbering 4.

Of course, any desired numbering orders are possible.

The correct numbering, i.e. the target order of connections A to D or E to H is read from the microcontroller 40 by the controller 20. The server system, in particular the microcontroller 40, stores information about the type of the server system. This is important not only for renumbering of connections of the circuit board, but also for fan controllers or other electronic adaptions, for example, which depend on the server type. The controller 20 can read this information from the microcontroller 40 or receives this information from the microcontroller 40 in the form of a control signal.

In an alternative embodiment, the controller 20 automatically reads this information from the microcontroller 40 or a storage in the computer system 30 when connecting the circuit board 10 in the server system 30 or respectively when applying an operating voltage to the controller 20.

The controller 20 then provides a corresponding presentation of the connections. To that end, the controller 20 uses an internal or external storage on the circuit board 10 and accordingly adapts the order of the connections. The controller 20 uses predetermined connection structures stored in the storage in the type of a matrix to that end, for example.

LIST OF REFERENCE CHARACTERS 1 to 4 connection order, numbering
10 circuit board
20 controller
30 server system
40 microcontroller
A to H connection

The invention claimed is:

1. A circuit board for a server system, the circuit board comprising:
   connections for receiving assembly groups; and
   a controller configured to provide a counting order for addressing the connections and to adapt the counting order depending on a first type or a second type of server system in which the circuit board is installed, wherein
   the circuit board is configured as a back plane for the assembly groups,
   the circuit board is configured to be inserted in the server system turned by 90 degrees with the connections having different orientations dependent on the server system being the first type or the second type, and
   the controller is configured to reverse the counting order of the connections dependent on the server system being the first type or the second type.

2. Circuit board according to claim 1, wherein the controller is configured to read or receive a control signal of a microcontroller connected to the circuit board and to provide the counting order of the connections depending on the control signal.

3. A server system comprising:
   a mainboard;
   a microcontroller configured to store a target order of connections that is dependent on the server system being a first type or second type; and
   a circuit board configured as a back plane for assembly groups and installed in the server system, the circuit board including connections for receiving the assembly groups and a controller configured to provide a counting order for addressing the connections and to adapt the counting order depending on whether the server system in which the circuit board is installed is the first type or the second type, wherein
   the circuit board is configured to be inserted in the server system turned by 90 degrees with the connections having different orientations dependent on the server system being the first type or the second type,
   the controller is configured to reverse the counting order of the connections dependent on the server system being the first type or the second type, and
   the microcontroller is configured to transmit a control signal to the controller, which includes the target order of the connections and depending on which the controller provides the counting order of the connections.

4. The server system according to claim 3, wherein the server system is a tower server system.

5. The server system according to claim 3, wherein the server system is a rack server system.

6. A server system comprising:
   a mainboard;
   a circuit board configured as a back plane for assembly groups and installed in the server system, the circuit board including
   connections for receiving the assembly groups, and
   a controller configured to provide a counting order for addressing the connections and to adapt the counting order depending on a first type or a second type of the server system in which the circuit board is installed, wherein
   the circuit board is configured to be inserted in the server system turned by 90 degrees with the connections having different orientations dependent on the server system being the first type or the second type, and
   the controller is configured to reverse the counting order of the connections dependent on the server system being the first type or the second type.

7. The server system according to claim 6, further comprising:
   a microcontroller adapted to provide a control signal, and wherein the controller of the circuit board is configured to read or receive the control signal of the microcontroller connected to the circuit board and to provide the counting order of the connections depending on the control signal.

8. The server system according to claim 6, wherein the server system is a tower server system.

9. The server system according to claim 6, wherein the server system is a rack server system.

* * * * *